(12) United States Patent
Reime (10) Patent No.: US 9,304,225 B2
(45) Date of Patent: Apr. 5, 2016

(54) METHOD AND SENSOR UNIT FOR LOCATING AND/OR DETECTING METALLIC OR METAL-CONTAINING OBJECTS AND MATERIALS

(71) Applicant: Gerd Reime, Buhl (DE)

(72) Inventor: Gerd Reime, Buhl (DE)

( * ) Notice: Subject to any disclaimer, the term of this patent is extended or adjusted under 35 U.S.C. 154(b) by 0 days.

(21) Appl. No.: 14/433,197

(22) PCT Filed: Oct. 2, 2013

(86) PCT No.: PCT/EP2013/002955
§ 371 (c)(1),
(2) Date: Apr. 2, 2015

(87) PCT Pub. No.: WO2014/053240
PCT Pub. Date: Apr. 10, 2014

(65) Prior Publication Data
US 2015/0247945 A1    Sep. 3, 2015

(30) Foreign Application Priority Data

Oct. 2, 2012   (DE) .......................... 10 2012 019 329

(51) Int. Cl.
G01N 27/72    (2006.01)
G01N 27/82    (2006.01)
G01V 3/10     (2006.01)

(52) U.S. Cl.
CPC . *G01V 3/10* (2013.01); *G01V 3/107* (2013.01)

(58) Field of Classification Search
CPC ..................................................... G01N 27/72
USPC ......................................................... 324/239
See application file for complete search history.

(56) References Cited

U.S. PATENT DOCUMENTS 5,729,143 A    3/1998   Tavernetti

FOREIGN PATENT DOCUMENTS

DE    3439369 A1    4/1986
DE    3912840 A1    10/1990
(Continued)

OTHER PUBLICATIONS

International Search Report for corresponding application PCT/EP2013/002955 filed Oct. 2, 2013; Mail date Jun. 2, 2014.

(Continued)

*Primary Examiner* — Bot Ledynh
(74) *Attorney, Agent, or Firm* — Cantor Colburn LLP (57) ABSTRACT

The method and sensor unit allow the location and detection of metallic or metal-containing objects and materials. A coil arrangement (1.2) comprises a transmission coil and a reception coil, which are arranged on top of one another, wherein the reception coil generates a reception coil output signal. A closed compensation control regulates the reception coil output signal in the receiving coil for compensating changes which occur in the detection range of the reception coil and influence the reception coil. To this end, compensation currents are fed into the receiving branch of the reception coil and are controlled relative to each other such that the reception coil output signal or average values which are detected from the reception coil output signal after demodulation are continuously regulated relative to each other to zero even in the case of metal influence. As a result, a coil with an unregulated transmission current can be used, in which a zero output signal is continuously generated. At the same time, the structural requirements for a compact structure of a sensor arrangement having a one-sided detection range are established.

19 Claims, 5 Drawing Sheets

(56) References Cited

FOREIGN PATENT DOCUMENTS

| DE | 4442441 | A1 | 8/1995 |
| DE | 10318350 | B3 | 12/2004 |
| DE | 102004047189 | A1 | 4/2006 |
| DE | 102005002238 | A1 | 7/2006 |
| DE | 102010005399 | A1 | 8/2010 |
| DE | 102010043078 | A1 | 5/2012 |
| DE | 102012001202 | A1 | 2/2013 |
| DE | 102012019329 | A1 | 4/2014 |
| EP | 1059542 | A2 | 12/2000 |
| WO | 2010133501 | A1 | 11/2010 |
| WO | 2012104086 | A2 | 8/2012 |

OTHER PUBLICATIONS

International Preliminary Report on Patentability for corresponding application PCT/EP2013/002955 filed Oct. 2, 2013.

METHOD AND SENSOR UNIT FOR LOCATING AND/OR DETECTING METALLIC OR METAL-CONTAINING OBJECTS AND MATERIALS

CROSS REFERENCE TO RELATED PATENT APPLICATIONS

The present application claims the priority of German patent application 10 2012 019 329.7, filed on Oct. 2, 2012, the disclosure of which is hereby expressly incorporated by reference into the subject matter of the present application.

TECHNICAL FIELD

The invention relates to a method and a sensor unit for locating and/or identifying metallic or metal-containing objects and materials.

BACKGROUND

From WO 2012/104086 A1 discloses a method for locating metallic or metal-containing objects and materials is known, wherein currents in at least two transmission coils are controlled relative to one another such that a reception coil output signal received by at least one reception coil or average values of demodulation phases generated from the reception coil output signal are continuously controlled to "zero" relative to one another, even under metal influence. In connection therewith, by demodulation at least at 0° and by a demodulation offset by 90°, the control values are detected and adapted as values so that a reliable detection of an object to be detected is possible even when other metallic objects are located in the detection region.

The prior later-published German patent application DE 10 2012 001 202 A1 describes a sensor with a coil arrangement wherein the normally circular windings of a coil are configured in a meandering form such that two transmission coils and one reception coil cooperate with one another such that the received signal is cancelled out. Therein a transmission coil is preferably arranged, respectively, above and below the reception coil, These have slightly different rotation angles relative to the reception coil, so that by means of the distribution of the transmission currents, the signal in the reception coil can be regulated to zero. This coil system thus consists of at least two, preferably three independent coil portions. Typically, for reasons of optimum contactability, the windings of the coils begin at the outer edge and are laid inwardly in a meandering form. From there, the current must reach the outside again and this can be achieved by means of a second layer with a meandering coil in which the coil current passes from the inside outwardly again. This increases the structural height.

From WO 2010/133501 A1, there is known an inductive sensor for detecting metallic objects, having a transmission coil arrangement with at least two transmission coils and at least one reception coil. By means of an evaluation and control unit, the transmission coils are energizable with transmission currents, wherein the winding sense of the transmission coils and the sign of the transmission current amplitudes are selected so that both transmission coils generate a magnetic field of the same direction at the location of the reception coil, Transmission coils and reception coils are geometrically arranged such that they overlap one another and induce a potential of zero or almost zero in the reception coil arrangement, i.e. the magnetic fields substantially compensate for one another. Beginning from such a balanced state, the induced voltage is then influenced by an object, resulting in a detection signal. The regulation takes place on the transmission side.

From DE 10 2004 047 189 A1 a metal sensor for building materials is known comprising a transmission coil and a reception conductor loop system which are inductively coupled to one another. The conductor loop system is formed by conductor structures on a circuit board. Since complete compensation does not take place, the measurement signals are digitized and a narrow-band digital filtration is carried out to reduce the noise bandwidth.

From DE 10 2010 043 078 A1, there is known a sensor device as a metal sensor with at least two coils and a magnetic field sensor wherein the arrangement of coils and the magnetic sensor relative to one another and, respectively, the number of coil windings or the winding sense of the coils or the coil current are selected such that the magnetic field generated by the coils approximately disappears at the location of the magnetic field sensor.

From DE 10 2005 002 238 A1, there is known a sensor for locating metallic objects, having a transmission coil and a reception conductor loop system inductively coupled thereto. The transmission coil is connected in series with the primary side of a neutralizing transformer, By this means, the smallest possible offset signal is generated.

For the detection of ferromagnetic substances, from DE 44 42 441 A1, a miniaturized arrangement made using planar technology is known for detecting magnetic permeability. The arrangement comprises coils which generate a magnetic flux, a flux conducting structure and flux-detecting components. Changes in the magnetic permeability are detected by the flux-detecting components, Through production using planar technology, a high degree of miniaturization and thereby a high level of spatial resolution is achievable.

From DE 103 18 350 B3, there is known an inductive proximity switch with a transmission coil and, arranged in its magnetic alternating field, a reception coil, wherein the magnetic flux applied in the reception coil by the alternating magnetic field approaches zero in the switching position or the rest position of the proximity switch. The coils are arranged adjacent and offset to one another, so that the field lines mutually penetrate the coils. One coil is ring-shaped, the other circular, wherein the circular coil overlaps the ring-shaped coil. With this embodiment, the sensing spacing is to the greatest possible extent uncritical in relation to temperature variations and mechanical influences of the coil support body.

From DE 39 12 840 A1, there is known a detector coil arrangement for an inductive detecting device. By the use of printed circuits for the detector coils and the manner of mounting the windings in the form of a conductor band of mutually adjacent conductor tracks on a common support layer, manufacturing and ease of production of the detector coil arrangement are ensured.

From DE 34 39 369 C2. there is known a method for detecting accompanying slag in a stream of metal melts, wherein the transmission coil and the reception coil are embedded in ceramic material. There is applied to the transmission coil a current containing a plurality of frequencies which induce a potential which is evaluated in a frequency-selective manner in the reception coil. The content of slag is determined by means of the pattern of the conductivity distribution, wherein a continuous or partially continuous measurement of the changing temperature of the melt and also of the measuring sensors is carried out.

Figure 5:
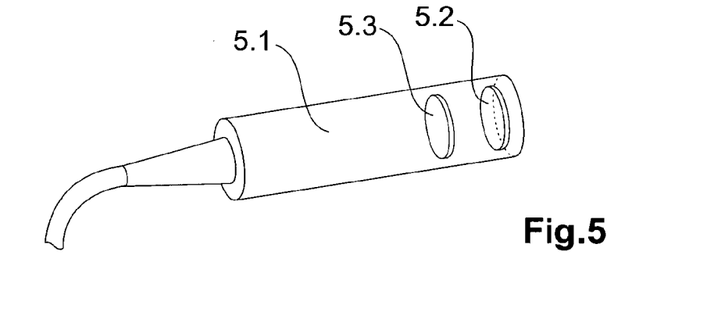
FIG. 5 shows a rod-shaped sensor system.

Inductive proximity sensors are commonly known and widely used, The typical design resembles a section of tube similar to the sensor element 5.1 according to FIG. 5. These sensors typically use a ferrite core for concentrating the field lines of the sensor coil. The installation of a sensor of this type is usually carried out through a hole in a wall which is often made of metal. For this purpose, the corresponding space must also be available. Although sensors without ferrite cores can achieve a great range, the immediate presence of metal, e.g. from a surrounding housing makes these sensors blind for further detection.

Cuboid-shaped sensors for detecting a metallic approach can be screwed onto surfaces. Typically, here also, a ferrite core is used for concentrating the field lines and defining the detection direction. These sensors are therefore relatively thick.

BRIEF SUMMARY

A method and a sensor unit are provided for locating and/or identifying metallic or metal-containing objects and materials, in which a coil with an unregulated transmission current is used, wherein a zero output signal is continuously obtained on the receiving side, The method and the sensor unit can be operated with a transmission coil and a reception coil, wherein compensation currents are fed into the receiving branch, preferably directly into the reception coil, and are regulated relative to one another such that a reception coil output signal received from the reception coil is continuously regulated to zero, even under metal influence. The one transmission coil and the one reception coil are arranged one over the other, preferably in a printed circuit. By means of this procedure and the use of only two coils, an inductive sensor element is achieved which is very compact and particularly can be configured in a very flat construction, thus providing the structural conditions for a compact construction of a sensor arrangement with a detection region at one side, All changes in the detection region of the reception coil are thus continuously regulated out, so that changes occurring in the reception coil are, in principle, immediately compensated for, although variations and differences are continuously and dynamically detected. The one transmission coil and the one reception coil are operated such that a differential compensation regulation is nevertheless possible.

Thus, for example, additionally but not exclusively ferrite-free inductive sensors having a very small structural height and a detection region formed on one side only, which can also be used in direct contact with a metallic environment, can be provided. Furthermore, the method permits the precise analysis of the metal to be detected, This does not merely concern whether the metal is iron or non-ferrous, but, for example, involves the classification of types of aluminum, The control of weld seams is also possible with this method and a sensor unit of this type.

Preferably, the transmission coil and the reception coil can be mounted on a printed circuit board wherein, in place of the metal housing, the circuit board has at least one metal coating arranged on one side o the coils. For the accommodation of the electronics needed for this sensor arrangement in the sensor housing, a somewhat greater thickness of the sensor can be utilized, although it would still be substantially less than the thicknesses of the sensors produced in the prior art. A further advantage is the "weld-proofness" since preferably no ferrite is used in the described invention and therefore electric fields, as occur, for example, close to welding robots, exert no influence on the detection properties. In this way, an inductive ferrite-free sensor in the form of a flat plate with e.g. only 1.3 mm thickness and a large range can be constructed. The detector field is herein only formed in one direction. This means that the sensor can be mounted on a non-metallic support material as well as on support materials made of metal, without the support material having an influence on the results of the sensor.

Preferably, two compensation regulation processes are carried out in parallel in that a first compensation regulation carries out a compensation at a phase position of 0° and 180°, whilst a second compensation regulation carries out a compensation at 90° and 27020 , wherein the compensation regulation processes lead to a regulation of the reception signal in the reception coil to zero, The control values required therefor are simultaneously evaluated in an evaluation unit. They can firstly be used to cancel out the influence of a metallic environment of the sensor unit, although they can then be used to locate objects and/or to analyze their metal types.

A flat construction of the sensor unit results, in particular, if the transmission coil and the reception coil comprise meandering conductor windings extending back and forth transversely to the peripheral direction of the coil windings and a substantially identical construction, wherein the transmission coil and the reception coil lie next to or on top of each other such that a plurality of symmetrically arranged overlapping regions are formed. In this case, there are preferably n meanders in an even central angle spacing along the periphery of the transmission coil and the reception coil and the coils are arranged rotated at an angle of approximately $360°/(n*2)$ to one another.

The sensor unit can be in the form of a rod, for example, for checking weld seams. It comprises a detection coil and a reference coil lying one behind the other in the sensor element, both of which transmit and receive simultaneously.

BRIEF DESCRIPTION OF THE DRAWING

The invention will now be described in greater detail making reference to the exemplary embodiments illustrated in the accompanying figures, in which.

DETAILED DESCRIPTION OF PREFERRED EXEMPLARY EMBODIMENTS

The invention will now be described in greater detail making reference to the accompanying drawings. However, the exemplary embodiments merely represent examples which are not intended to restrict the inventive concept to a particular arrangement. Before the invention is described in detail, it should be noted that the invention is not restricted to the various components of the device and the various method steps, because said components and methods can vary. The expressions used here are intended merely to describe particular embodiments and are not used restrictively. If, furthermore, the singular or the indefinite article is used in the description of the claims, this also relates to a plurality of these elements, provided the overall context does not clearly signify otherwise.

Figure 1A:
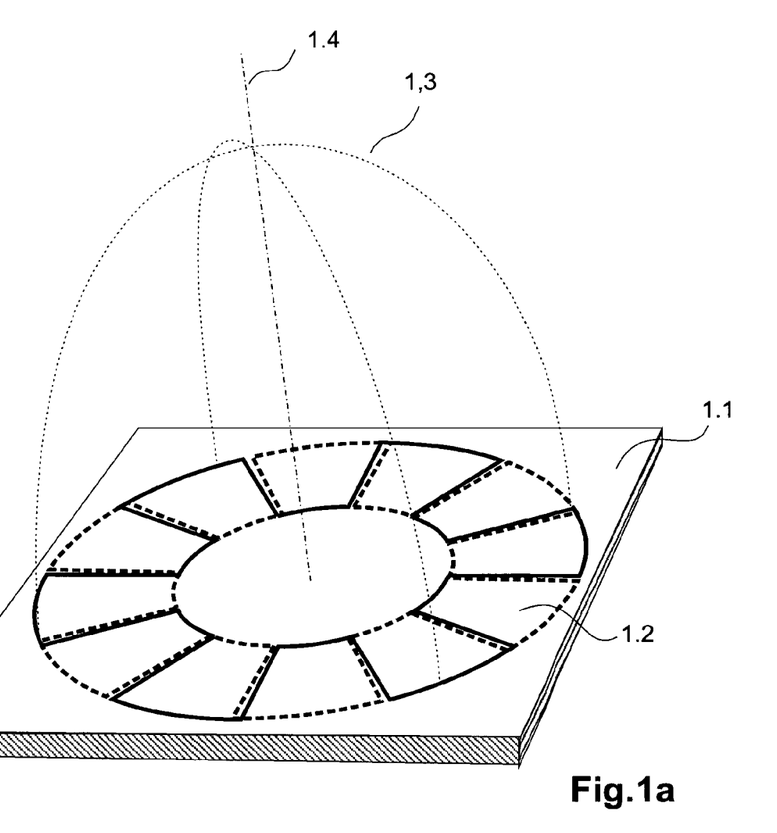
FIG. 1a shows a sensor in a metallic housing in a three dimensional representation.

The drawings show exemplary embodiments of the coil arrangement and the associated circuit for a flat sensor with the advantages described above. FIG. 1a shows a sensor of this type with a metallic housing 1.1 in a perspective view. In a metallic plate made, for example, of aluminum with an edge length of 50×50 mm, a special coil arrangement 1.2 is installed such that on the underside of the coil arrangement, for example, a metal thickness of 0.3 mm still remains, as shown in section in FIG. 4. By means of this coil arrangement, which will be considered below, a symbolically represented detection region 1.3 is formed along the central axis 1.4, specifically only in one direction, thus in FIG. 1a, upwardly. Downwardly and to the side, the sensor is entirely insensitive to the presence of metal.

Figure 4:
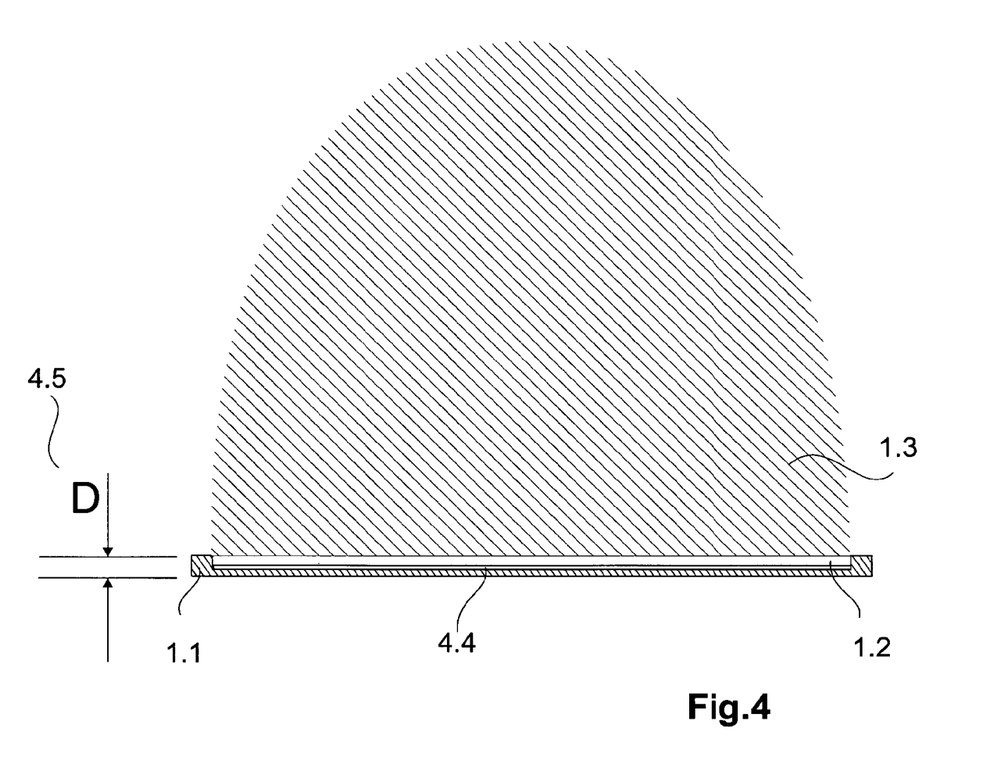
FIG. 4 shows a sensor according to FIG. 1a in a sectional view.

The metal housing 1.1 has a recess into which the coil arrangement 1.2 is set, The coil arrangement comprises of a 2 to n-layered printed coil which, with conventional production techniques using a two-layered construction can be, for example, 0.3 mm thick. Advantageously, arranged between the coil arrangement 1.2 and the metallic housing 1.1 is a non-metallic spacing element 4.4 having a thickness of, for example, 0.6 mm. If 0.1 mm is added to the sensor surface for a protective layer, then a total thickness D of the sensor of 1.3 mm results.

In a further exemplary embodiment, the coil arrangement can also be constructed without a metal housing and nevertheless be configured for only one-sided field formation. For this purpose, instead of the metallic spacing element 4.4, one or two further copper layers are applied onto the printed board. This means that the entire sensor element with a sensitivity region formed exclusively on one side can comprise a printed circuit board with, for example, a thickness of 1 mm.

For the accommodation of the electronics needed for this sensor arrangement in the sensor housing, a somewhat greater thickness of the sensor can be utilized, although it would still be substantially less than the thicknesses of the sensors produced in the prior art. A further advantage is the "weldproofness" since preferably no ferrite is used in the described invention and therefore magnetic fields, as occur, for example, close to welding robots, exert no influence on the detection properties.

In the exemplary embodiments, a coil arrangement as known from the prior, subsequently published German patent application DE 10 2012 001 202 A1 is used. With this coil arrangement, the normally circular windings of a coil are configured in a meandering form such that two transmission coils and one reception coil cooperate with one another such that the received signal is cancelled out. Preferably, a transmission coil is arranged, respectively, above and below the reception coil. The transmission coils have slightly different rotation angles relative to the reception coil, so that by means of the distribution of the transmission currents with currents regulated to be opposed in their amplitude, the signal in the reception coil can be brought to zero and a zero signal is generated in the receiver. The measurement value is obtained from the control values which change under metal influence.

This coil system thus comprises at lea three independent coil portions. Typically, for reasons of optimum contactability, the windings of the coils begin at the outer edge and are laid inwardly in a meandering form. From there, the current flows outwardly again through a second layer with meandering coils. On the assumption that it is not desirable for a cable to be laid out of the coil from inside, there only remains the possibility of a further plane in the printed coil for this connection. There are therefore two planes for each coil, that is, in total 6 planes. Using average production technology, this corresponds to a thickness of the board of approximately 1.5 mm. If a spacing element with a thickness of 0.6 mm is added thereto, this results in an overall thickness of 2.1 mm or more just for the coil arrangement. The material thickness for a metallic housing with the necessary spacing from the coil system has not yet been included herein.

According to the invention, only two meandering coils are used. Only one meandering transmission coil is used, the current of which is not regulated. A single meandering reception coil with a corresponding rotation angle relative to the one transmission coil would not itself generate a zero output signal. Without any metal influence, given an optimum rotation angle of the two coils relative to one another, the output signal of the reception would indeed be zero, but not under the influence of a metal.

The exact explanation for this is to be found in the prior, subsequently published German patent application DE 10 2012 001 202 A1, the content of which is also made the subject matter of the present application. The essential content is described below making reference to FIGS. 1a, 1b.

Figure 1B:
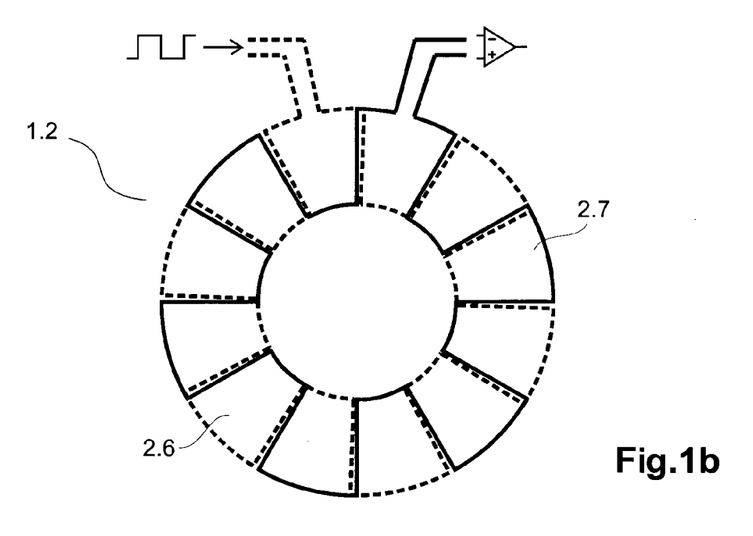
FIG. 1b shows a schematic plan view of the sensor coils of the sensor according to FIG. 1.

FIG. 1b shows the transmission coil 2.6 and the reception coil 2.7 for a coil arrangement of this type. The transmission coil 2.6 is shown dashed in each case to distinguish it from the reception coil 2.7. Essentially, conductor sections extending transversely to the longitudinal direction of a conductor, i.e. back and forth, are bent into windings of the transmission coil 2.6 and of the reception coil 2.7. The number n of the meanders is arbitrary and is decided by the coil configuration used. The larger the number, the more rotationally symmetrically the coil behaves. In practice, a number from six to ten meanders on the circular periphery, as shown in FIG. 1b by way of example, for a printed coil has proved to be generally sufficient. The description below is based on a coil with six loop sections.

The reception coil 2.7 can be configured essentially the same as the transmission coil 2.6, It is mounted exactly coincidently on (or under) the transmission coil at "approximately" 30 degrees offset. In this way, it "receives" the same number of field lines of different direction so that the transmission coil exerts no inductive effect on the reception coil. A metallic object in front of this coil system is excited by the transmission coil 2.6, whilst the central reception coil regions which are largely congruent receive the transmitted field undisturbed by the metal object. Within the inwardly open meanders of the reception coil 2.7, field lines of an inverted field caused by the current flowing in the transmission coil 2.6 arise, whereas in the interior of the reception coil, a field is formed having the same sense as the field lines of the transmission coil, said field supporting the function and thus the range of the transmission coil.

If the transmission coil 2.6 is rotated relative to the reception coil 2.7 and if the transmission current in the transmission coil 5.1 is clocked, the potential arising in the reception coil is changed. Starting at 0 degrees, only the field lines which arise within the inner region of the transmission coil 2.6 are detected. At 30 degrees rotation, the inverted outer field lines are additionally detected, whilst the detection of the field lines in the inner region declines accordingly. An optimum arrangement of the coils comes about when, exactly at 30° or even at a small angular region before reaching the 30° shift between the transmission and reception coil, the transmission signal is cancelled out in the reception coil 2.7, that is, a "zero" value results. The small angular region can lie, for example, in a region of 0.2 degrees. In this position, therefore, the magnetic fields of the transmission coil 2.6 are completely cancelled out in the reception coil.

As a result of the interaction of the transmission coil 2.6 and the reception coil 2.7, a local point of optimal cancellation of the fields transmitted by the transmission coil takes place in the reception coil. In this case, the coils are arranged such that, with the same current applied, the transmission coil portions exert an effect on the at least one reception coil, wherein a local point of the optimal cancellation of the emitted fields arises in the reception coil. This local point of the optimal cancellation is influenced by a metallic approach according to the subsequently published patent application DE 10 2012 001 202 A1.

In an arrangement in a very flat sensor arrangement in a metal housing as described above (or with a copper surface of a printed circuit board), a metal influence exists. In this case, no zero signal can even be reached through a change in the rotation angle of both coils. Therefore partially a method is used which is described in WO 2012/104086 A1, the content of which is also made the subject matter of the present invention. Essentially, the coil currents of two transmission coils are regulated relative to one another such that no output signal arises in the reception coil. For this purpose, the phases of the transmission signal are divided into two partial regions which are regulated in the amplitude thereof separately from one another.

In the invention described herein, essentially the same regulation algorithm for zero-signal creation is used as in WO 2012/104086 A1, but as distinct from WO 2012/104086 A1 in which the currents of the transmission coils are regulated, herein a zero output signal from the reception coil is achieved in a different way.

The following consideration is the starting point for this:

The alternating magnetic field of a transmission coil generates eddy currents in a metallic object and these in turn generate a magnetic field which is received by the reception coil. In the sensor arrangement as described according to FIGS. 1a, 1b, 4, the metallic environment, the housing 1.1, of the printed coil accordingly creates large eddy currents and secondary magnetic fields arising therefrom. These, in turn generate relatively strong currents in the reception coil 2.7, which can be evaluated accordingly.

Figure 2:
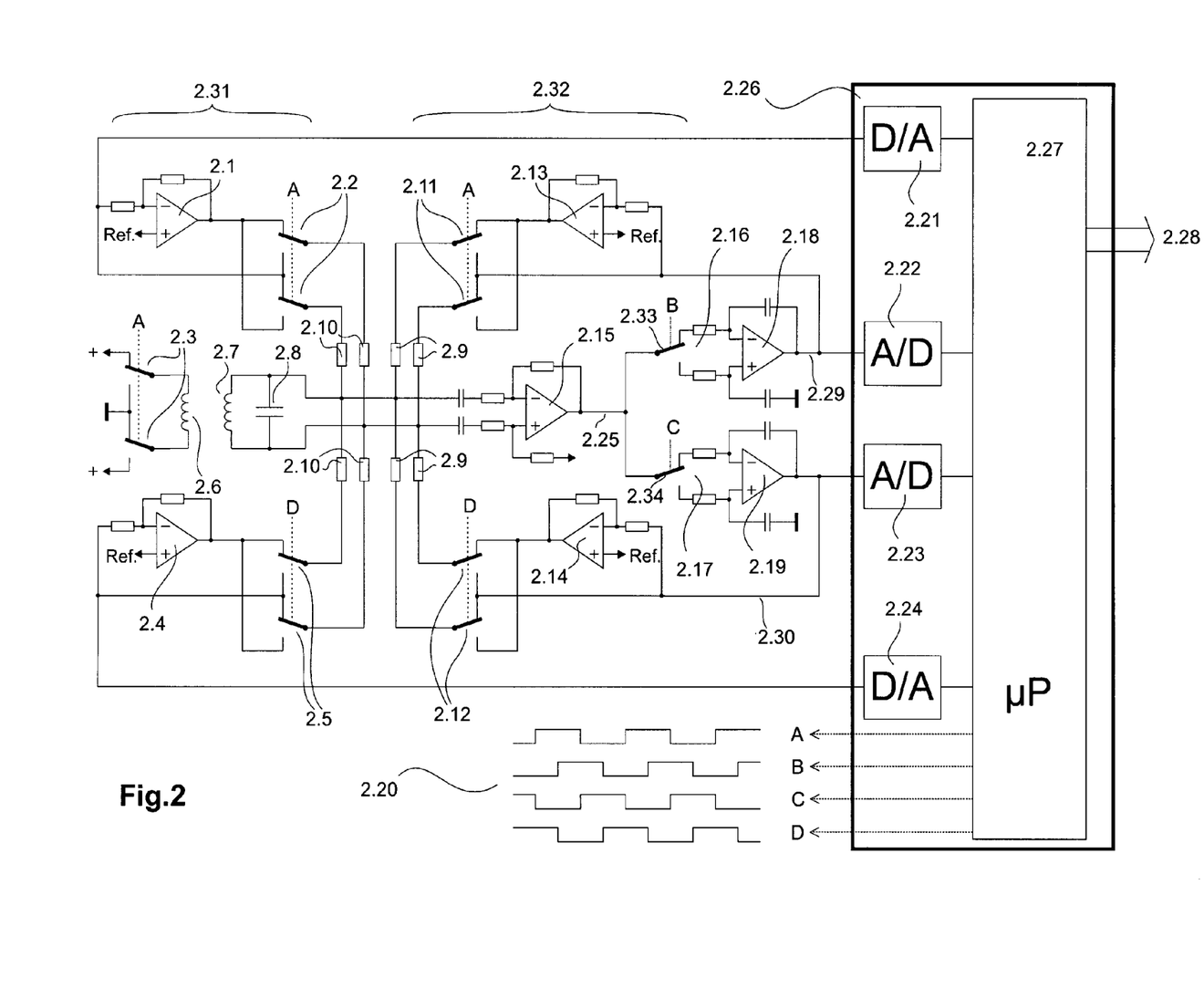
FIG. 2 shows a circuit arrangement for a sensor according to FIGS. 1a, 1b.

In order to obtain an output signal which is as far as possible sinusoidal, the formation of a resonance by means of a resonance capacitor 2.8 parallel to the reception coil 2.7 according to FIG. 2 is useful. In this case, the currents arising through the secondary magnetic field can easily be compensated for by opposing currents, even if these currents do not have a sinusoidal pattern. The opposing currents are regulated in their amplitude such that the reception coil 2.7 or the downstream pre-amplifier 2.15 supplies no clock synchronized output signal 2.25.

Figure 6:
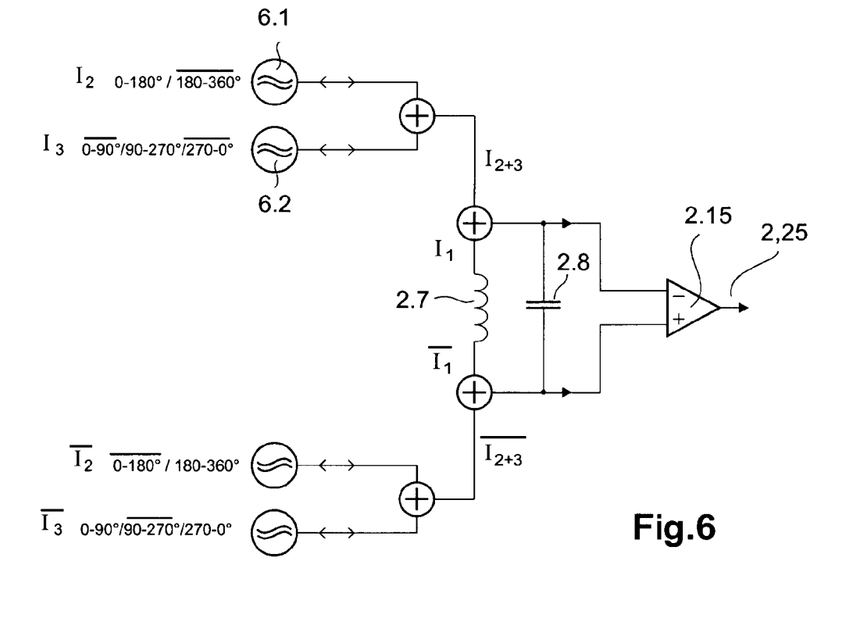
FIG. 6 shows a symbolic representation of the current feed into the coil terminal of the reception coil.

According to FIG. 6, in the presence of metal, a transmission clock synchronized current signal $I_1$ arises in the reception coil 2.7. It is the aim to make this reception signal completely and continuously "zero", For this purpose, two currents $I_2$ and $I_3$ which are regulable separately from one another are fed to the reception coil 2.7. FIG. 6 illustrates this step symbolically. For simplification, only the current feed to the first, upper coil terminal is considered and the feed into the second coil connection takes place exactly as for the first coil connection, but with inverted currents. In a circuit variant, the feeding into the second coil terminal can also be omitted, although this results in a reduced dynamic range of the sensor.

On approach of a metal, a reception coil 2.7 supplies a current signal to the pre-amplifier 2.15 which is dependent in its amplitude and phase on the type of metal. In the non-regulated-out state, that is, the compensation currents $I_2$ and $I_3$ are not yet regulated to their target values, a clock synchronized output signal 2.25 therefore exists at the output of the pre-amplifier. By means of the synchronous demodulators 2.16 and 2.17 shown in FIG. 2. amplitude and phase information is obtained from the output signal 2.25 (see below). With this information, a first clocked current source 6.1 is constantly regulated with the compensation current $I_2$ and a second clocked current source 6.2 is constantly regulated with the compensation current $I_3$ such that a continuous zero output signal 2.25 appears. This means that no clock synchronized portions are present in the output signal 2.25. The clock sequences of both current sources 6.1, 6,2 are offset by 90° and both current sources can supply positive or negative current with any desired values. The information regarding the type of metal is taken from the two regulation variables for $I_2$ and $I_3$.

Figure 7:
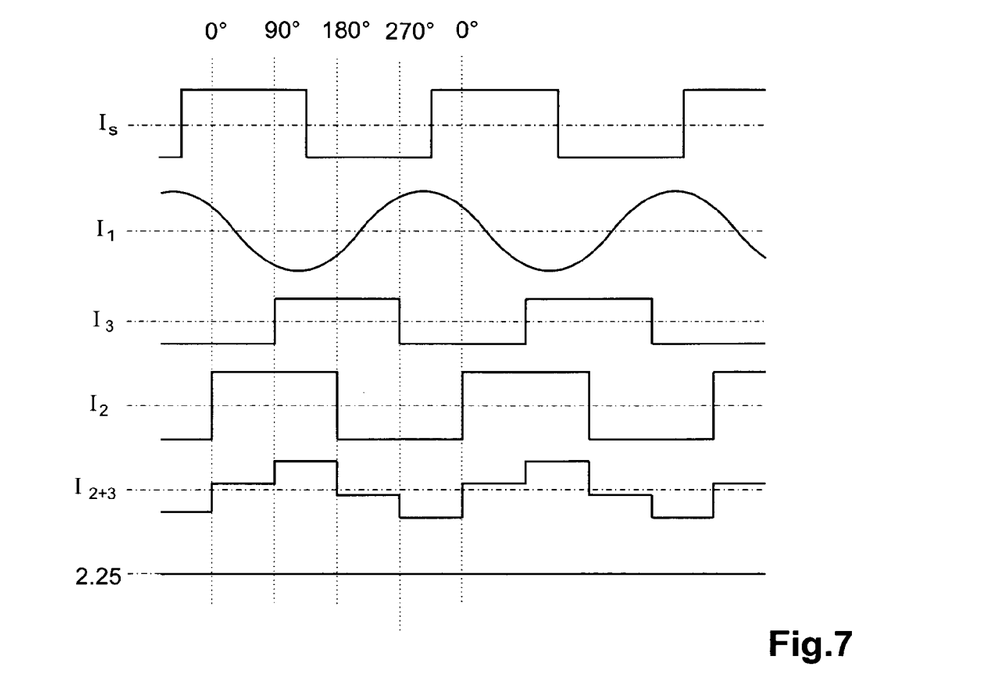
FIG. 7 shows current characteristics of the transmission current and the current feed as well as the output signal according to FIG. 6.

FIG. 7 illustrates this process in somewhat more detail: the transmission coil 2.6 is supplied with the current $I_s$. The phase of this current $I_s$ is not relevant and it must only have a fixed phase value relative to the phases of the compensation currents $I_2$ and $I_3$. However, the compensation currents $I_2$ and $I_3$ have a fixed phase offset of 90° to one another. Exactly the same applies with regard to the phase position for the synchronous demodulators 2.16 and 2.17. They must only have a fixed phase shift of 90° and the absolute phase position relative to the transmission clock signal is unimportant provided it is constant. The phase position 2.20 of the control signals A, B, C, D for the switching times of the changeover switches 2.2. 2.3, 2.5, 2.11, 2.12. 2.33, 2.34 is essentially made clear in FIGS. 2 and 3 at bottom right.

Without the compensation currents $I_2$ and $I_3$, for example, a current would then arise at the reception coil 2.7. The phase and amplitude are dependent on the metallic surroundings of the coil system 2.6 and 2.7. By means of the aforementioned synchronous demodulation with a high-gain comparator 2.15, the current is evaluated. Thus, the compensation currents $I_2$ and $I_3$ can be regulated accordingly in their amplitude. The added compensation currents $I_2+I_3$ are again added to the current at the upper coil terminal of the reception coil 2.7. By varying the compensation currents $I_2$ and $I_3$, a common current $I_2+I_3$ can be generated which compensates for the current of the reception coil 2.7 in such a way that an output signal 2.25 without a clock synchronized portion, that is a "zero" signal, exists at the output of the pre-amplifier 2.15.

The high frequency spectral portions of the compensation currents—in the exemplary embodiment, these are square wave currents—do not interfere since the compensation currents are coupled with relatively high resistance (some kOhms) into the oscillator circuit made up of the reception coil 2.7 and the resonance capacitor 2.8. Preferably, sinusoidal signals are formed in this oscillator circuit.

In the exemplary embodiments described herein, square wave transmission and compensation currents are used, Naturally, this method can also be used with sinusoidal currents.

If the reception current o the reception coil 2.7 has been compensated to "zero" with this method, the compensation currents $I_2$ and $I_3$ have assumed particular positive or negative values. In the exemplary embodiment described, these values represent the metallic environment of the coil system, e.g. the metallic housing 1.1.

If these values are stored, for example, by means of the AD converters 2.22. 2.23 and the microprocessor 2.27, then from a further change in the values, a metallic approach can be concluded.

In order, additionally, to analyze the approaching metal, a further, essentially similar regulation 2.31 of further compensation currents can be used. The first, previously described regulation regulates the received currents of the reception coil 2.7 to "zero", that is, it regulates out the influence of the metal housing 1.1. In the next step, the determined values of the compensation currents $I_2$ and $I_3$ are stored, e.g. by means of the AD converters 2.22. 2.23 and the microprocessor 2.27. Thereafter, the further regulation can compensate a proximity of a metal to "zero", wherein from the control values obtained, conclusions can be drawn regarding the metal type, If the dynamic scope of the measuring system is not of great importance, a one-sided compensation of the reception current is sufficient.

Furthermore, a "zero" signal can be achieved if only a single current regulated in its amplitude and also in its phase is supplied to the reception coil 2.7. Herein, simply the first and the second compensation current are replaced by a variable phase shift of the remaining compensation current. Since, according to experience, this can be realized in practice with somewhat more effort—due to the small phase steps required for a high resolution—a more detailed description is dispensed with here.

The exact procedure of the regulation is described in greater detail based on the following exemplary embodiments, making reference to the circuits.

The first exemplary embodiment according to FIG. 2 shows a circuit arrangement for the above-described very flat sensor arrangement. In this circuit, four independent regulating circuits are provided. For the basic function, just two regulating circuits can also be used and the advantageous use of the two further regulating circuits is set out at the end of the description. The regulation described first with its two regulating circuits is identified in FIG. 2 as 2.32 and serves to cancel the influence of the housing 1.1.

The transmission coil 2.6 receives a square-wave current 1, from the changeover switch 2.3 for clocked current inversion. The clock signal comprises a plurality or a multiplicity of clock cycles which themselves comprise the switching-on time portions A, D or B, C. respectively, according to FIG. 2. bottom. Naturally, a sinusoidal signal can also be used as the transmission signal.

A reception coil 2.7 is arranged in the arrangement according to FIG. 1b in its rotation angle relative to the transmission coil 2.6 such that a signal emitted by the transmission coil 2.6 is, as far as possible, cancelled in the reception coil 2.7. As previously described, this cannot take place completely due to the influences of the metal housing 1.1. Therefore, the reception coil 2.7 generates a clock synchronized current which is present at the output of the pre-amplifier 2.15 as an output signal 2.25. This output signal 2.25 is fed to both the synchronous demodulators 2.16 and 2.17, Both synchronous demodulators are controlled by a clock signal respectively shifted by 90°. This means—as shown, for example, symbolically in FIG. 6—that, for example, the synchronous demodulator 2.16 feeds the output signal 2.25 into the portions 0-180° of a clock cycle to the one input of the high-gain comparator 2.18, whereas the output signal 2.25 in the 180-360° portion is fed to the other input.

The comparator 2.18 is configured as an integrating comparator so that the average values from the portions 0°-180° and 180°-360° are compared, High-gain means that every deviation of the average values, no matter how small leads to a noticeable change in the output voltage.

The output voltage of the comparator 2.18 is fed once directly and once via the voltage inverter 2.13 to the changeover switch 2.11 for clocked current inversion. Thus, two synchronously clocked signals of the regulating voltage 2.29 that are opposite in polarity and dependent on the output voltage of the comparator 2.18 exist at the output of the changeover switch 2.11, said signals feeding a compensation current $I_2$ or $I_3$ via the resistors 2.9 into the reception coil 2.7. With that, the regulation of the compensation current for the clocked portions 0°-180° and 180°-360° is completed. The regulated compensation current in these clock sections has the effect that that average value of the reception signal of the reception coil 2.7 in the clocked portions 0-180° and in the clocked portions 180-360° is always exactly the same size.

Naturally, in the clocked portions 90°-270° and 270°-450° (450°=360°+90°) a further clock synchronized signal portion can be present. In order also to make this "zero", the output signal 2.25 is demodulated with a further synchronous demodulator 2.17 into the clocked portions 90°-270° and 270°-450° and the demodulated signals associated with the clocked portions are compared with one another in a further high-gain comparator 2.19. The output value, the regulating voltage 2.30, similarly to the previously described circuit, is fed once directly and once via the voltage inverter 2.14 to the changeover switch 2.12 and is converted into a further clock synchronized compensation current and is fed to the reception coil 2.7. Thus, the complete reception signal of the reception coil 2.7 is continuously made "zero".

The information concerning the metal influence which, in the not regulated-out state of the reception signal was present in the phase and amplitude of the reception signal, was converted into a first regulating voltage 2.29 and a second regulating voltage 2.30. In the exemplary embodiment, both regulating voltages are fed via the ND converter 2.22 and 2.23 to the microprocessor 2.27 for further evaluation.

The two regulating voltages 2.29 and 2.30 represent the values for the metallic housing 1.1. They represent, in effect, a fixed offset value which can be removed in this case. A metallic approach alters both the values and the metallic approach can therefore be clearly detected. In the simplest case, for this purpose, both potential values are stored in the state without any further metallic approach. A change in the measured values from the stored values can not only bring information about an approach of metal, but from an evaluation of the change in both values 2.29 and 2.30, conclusions can be drawn about the type of metal. For this purpose, the method described in more detail in WO 2012/104086 A1 is used.

In practice, different aluminum types, steel types, the carat number of gold alloys or, for example, the quality of weld seams can thus be clearly and unambiguously distinguished. WO 2012/104086 A1 proceeds from a coil system without a metal housing. In this case, the first regulating voltage 2.29 and the second regulating voltage 2.19 would assume approximately equal values in the middle of their regulating range, since no compensation currents are needed. The case is different with a metallic housing 1.1 in the immediate vicinity of the coil system. An "offset" due to the presence of metal could now lead to the regulating voltages deviating so far from the mean value that the regulating voltage limits are no longer far away.

Example: the regulating voltage mean value without any metal influence, that is, without the housing is e.g. 2 Volt given a supply voltage of the system of 4 Volt. In this case, 2 Volt means that no compensation current is fed into the reception coil 2.7. However, with a metallic housing, a regulating voltage of e.g. 35 Volt results, that is, a relatively "powerful" compensation current is fed into the reception coil 2.7 in order to achieve a "zero" signal. A further metallic approach could now lead to an "overdriving" of the comparator 2.18 or 2.19.

Naturally, in this case, a reduction in the resistance values of the resistors 2.9 can counteract this, although this can lead to a possible reduction in the resolution due to the restricted step width of the A/D converter. In order to prevent this in the exemplary embodiment, a second compensation current regulation 2.31 is provided which is essentially configured like the compensation current regulation 2.32.

Once the sensor unit is put into operation, the compensation current regulation 2.31 regulates out, for example, the housing influences of the metallic housing 1.1. For this purpose, the values obtained by the synchronous demodulators 2.16 and 2.17 are detected in the evaluation unit 2.26 with the AID converters 2.22 and 2.23 and compared in the microprocessor 2.27 with a fixed value, for example, the voltage value "Ref". It is self-evident that no further metal should be present during this time.

By means of the D/A converters 2.21, 2.24, the compensation currents of the regulation 2.31 in the phases 0°-180° and 90°-270° are changed in their amplitude until the regulating voltages 2.29 and 2.30 assume a value in which no compensation current flows via the resistors 2.9. In the exemplary embodiment, this corresponds to the state where the regulating voltages 2.29 and 2.30 reach the voltage value "Ref". Following completed regulating-out of the compensation current values and the thereby arising "zero" output signal 2.25, the values of the D/A converter 2.21, 224 are recorded in the microprocessor 2.27, that is, stored and, from now on, the stored values are fed as a fixed compensation current value, via the resistors 2.10, to the reception coil 2.7. In this compensation regulation also, voltage inverters 2.1, 2.4 are provided for the changeover switches 2.2, 2.5. The regulation 2.31 has thus carried out the "masking out" of the metallic housing. The control values, once determined in this way are essentially no longer changed during the further measurement or analysis of metal objects approaching the sensor.

An approach of metal to the sensor unit evokes a change in the regulating voltage 2.29 and 2.30. In this event, however, the change is started from the middle of the regulating voltage range. This means that the entire dynamic range of the sensor unit is available for the metal analysis. This is useful since, depending on the metal type, the regulating voltages can move from the middle in either direction. At the same time, the sensitivity can be increased since the resistors 2.9 can be configured with higher resistance values than the resistances 2.10, The compensation current is thus only permitted within a narrow range, which in turn leads to large changes in the regulating voltages 2.29 and 2.30 with relatively distant metal objects. The change in the regulating voltages on a metallic approach is passed via the AID converters 2.22 and 2.23 to the microprocessor 2.27 of the evaluation unit 2.26, which evaluates it accordingly and feeds the output data 2.28, for example, to a display. The evaluation for analysis of the detected metal objects or the removal of selected objects was already described in greater detail in WO 2012/104086 A1.

A further exemplary embodiment of the circuit described above is shown in FIG. 3. In this case, no meandering coil is used, but rather simply wound or printed coils in a rod-shaped sensor system as shown in FIG. 5. However, this does not mean that differently shaped coils could not be used, With a rod-shaped sensor element 5.1 of this type, having, for example, a 3 mm diameter, an analysis of the metal structure can, for example, easily be carried out on difficult to reach weld seams. With such a small diameter, a meandering coil is difficult to achieve. Therefore, in the exemplary embodiment of FIG. 5, an easy to produce simple coil is used as the detection coil 5.2 in the housing of the sensor element 5.1. A similar coil is preferably located as a reference coil 5.3 in the same housing 5.1. The coils can naturally also be equipped with a ferrite core or a ferrite pot-type core, although this is not essential.

Figure 3:
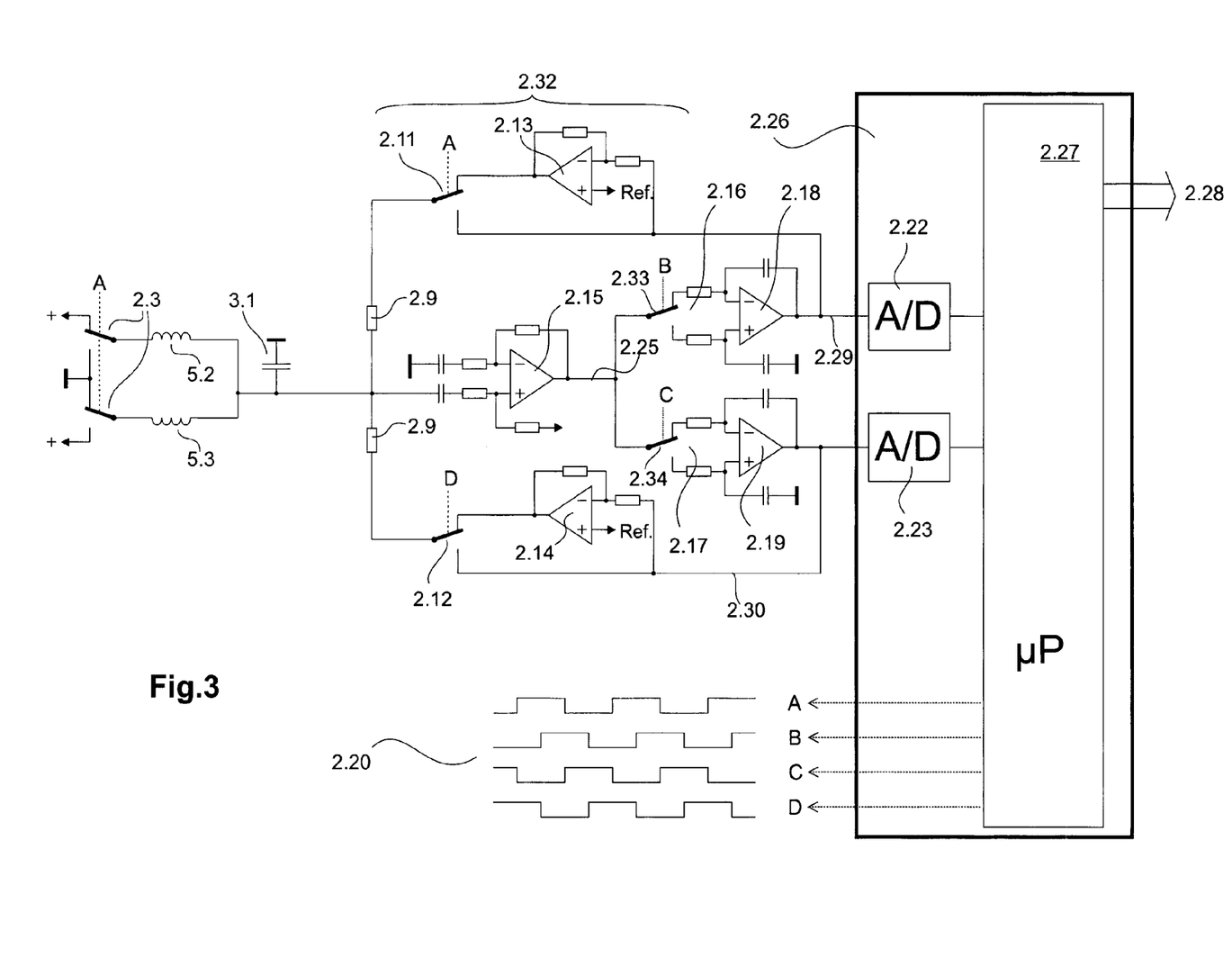
FIG. 3 shows a circuit arrangement for a sensor according to FIGS. 1a, 1b in a further exemplary embodiment.

FIG. 3 shows a simple connection of the coils 5.2 and 5.3 to the electronics. The changeover switch 2.3 for clocked current inversion supplies a square-wave output voltage to one of its two outputs, whereas the other output supplies the same clock signal, but inverted. A coil is connected to each of the two outputs, the other ends of said coils being connected together. The resonance capacitor 3.1 acts on both coils. Without any metallic approach to one of the two coils 5.2 or 5.3, no voltage forms on the resonance capacitor 3.1. The voltages or currents from the changeover switch 23 are each inverted, so that the current direction in the coils changes in a clocked manner, although the voltages at the joined ends of the coils, that is, at the resonance capacitor 3.1, cancel out. One of the two coils is configured as a detection coil 5.2 in that it is mounted at the front of the rod-shaped sensor element 5.1. The other identical coil is arranged as a reference coil 5.3 at a distance therefrom. Both coils transmit and receive simultaneously, that is, transmission and reception take place at the same moment with the same coil.

If a metal approaches the detection coil 5.2. due to the magnetic fields, eddy currents form in the metal, said eddy currents in turn affecting the "transmitting" detection coil 5.2 and inducing a current there. In the exemplary embodiment, the changeover switch 2.3 switches the voltage in the coils with low resistance in that, for example, the switch switches its output in a clock synchronized manner alternately to ground and the supply voltage. Thus, no additional voltage can form here. However, since due to the low-resistance connection, the current from the retroacting magnetic field can flow almost unhindered, this current forms a clock synchronized signal voltage at the resonance capacitor 3.1.

By means of the previously described compensation current regulation 2.32. this signal voltage can now be regulated to "zero" and the values of the regulating voltages 2.29, 2.30 can be evaluated as described for the first exemplary embodiment.

Naturally, if needed, the currents from the changeover switch 2.3 can be regulated accordingly in that, for example, the compensation currents do not act on the common resonance capacitor 3.1, but separately on the sides of the coils, which are connected to the changeover switch in FIG. 3. This type of current regulation has essentially already been described in WO 2012/104086 A1.

It is self-evident that this description can be subject to the widest variety of modifications, changes and adaptations, which belong within the domain of equivalents to the accompanying claims.

The invention claimed is:

1. Method for locating and/or identifying metallic or metal-containing objects and materials, comprising a coil arrangement in which a transmission coil and a reception coil are arranged over one another, wherein the reception coil generates a reception coil output signal, comprising a closed-loop compensation regulation of the reception coil output signal for compensation of changes in the reception coil, said changes occurring in a detection region of the reception coil and influencing the reception coil, wherein compensation currents are fed into a receiving branch of the reception coil and are regulated relative to one another by means of regulating values such that the reception coil output signal or average values acquired from the reception coil output signal after demodulation are continuously regulated to zero relative to one another, even under influence of a metal, wherein the regulating values are evaluated in order to locate and/or identify the metallic or metal-containing objects and materials.

2. Method according to claim 1, wherein the compensation currents are fed directly into the reception coil.

3. Method according to claim 1, wherein the transmission coil and the reception coil are mounted in a printed circuit.

4. Method according to claim 1, wherein the transmission coil and the reception coil are flat and are mounted in a metallic housing, wherein an electric field forms as the detection region extending on one side from the metallic housing, transversely away from an areal extent of the transmission coil and the reception coil.

5. Method according to claim 4, wherein the transmission coil and the flat reception coil are in the form of meanders.

6. Method according to claim 4, wherein the metallic housing is replaced by at least one metallic coating of a circuit board of a printed circuit, said metallic coating being arranged on one side of the transmission coil and the reception coil.

7. Method according to claim 1, wherein the coil arrangement is provided without a ferrite core.

8. Method according to claim 1, wherein an average value of a first demodulated signal in a first demodulation phase in a stabilised state is the same size as an average value of a second demodulation phase of a second demodulated signal and that a possibly existing difference of the first demodulated signal and the second demodulated signal to one another between the first and second demodulation phases is regulated out, wherein the regulating value thus determined is used as a detection value for locating and/or identifying metal types.

9. Method according to claim 8, wherein the compensation regulation comprises a first compensation regulation and a second compensation regulation and that the first compensation regulation carries out a compensation at a phase position of 0° and 180°, whilst a second compensation regulation carries out a compensation at 90° and 270°, wherein the compensation regulation leads to a regulation of a reception signal in the reception coil to zero.

10. Method according to claim 1, wherein a first determination of the regulation values for a compensation regulation in the presence of a metallic housing or a metallic coating of the sensor unit is carried out and in that the regulating values determined therein which lead to a reception signal in the reception coil becoming a zero signal in the absence of further metallic approach are stored for a masking out of the metallic housing or the metallic coating and, on further location and/or identification of metallic or metal-containing objects and materials, are used so that a location and/or identification of metallic or metal-containing objects and materials is possible while using a further compensation regulation with the same regulation algorithms.

11. Sensor unit for locating and/or identifying metallic or metal-containing objects and materials, comprising a coil arrangement in which a transmission coil and a reception coil are arranged over one another, wherein the reception coil generates a reception coil output signal, comprising a closed-loop compensation regulation for the reception coil output signal for compensation of changes in the reception coil, said changes occurring in a detection region of the reception coil and influencing the reception coil, wherein compensation currents are fed into a receiving branch of the reception coil and are regulated relative to one another by means of regulating values such that the reception coil output signal or average values detected from the reception coil output signal after demodulation are continuously regulated to zero relative to one another, even under metal influence, and comprising an evaluation unit evaluating the regulating values in order to locate and/or identify objects and materials.

12. Sensor unit according to claim 11, wherein the compensation currents are fed directly into the reception coil.

13. Sensor unit according to claim 11, wherein the transmission coil and the reception coil are mounted in a printed circuit.

14. Sensor unit according to claim 11, wherein the transmission coil (2.6) and the reception coil are flat and mounted in a metallic housing, wherein an electric field forms as the detection region extending on one side from the housing, transversely away from an areal extent of the transmission coil and the reception coil.

15. Sensor unit according to claim 14, wherein the metallic housing is replaced by at least one metallic coating of a circuit board of a printed circuit, said coating being arranged on one side of the transmitting coil and the reception coil.

16. Sensor unit according to claim 11, wherein the coil arrangement is ferrite-free and has a detection region on one side only.

17. Sensor unit according to claim 11, wherein the transmission coil and the reception coil comprise meandering conductor windings extending back and forth transversely to a peripheral direction of the coil windings and an identical construction, wherein the transmission coil and the reception coil lie on top of each other such that a plurality of symmetrically arranged overlapping regions are formed.

18. Sensor unit according to claim 17, wherein n meanders are arranged in an even central angle spacing along the periphery of the transmission coil and the reception coil and in that the coils are arranged rotated at an angle of approximately 360°/(n*2) to one another.

19. Sensor unit according to claim 11, wherein it comprises a detection coil and a reference coil both of which simultaneously transmit and receive, wherein the coils are arranged one behind the other in a rod-shaped sensor element in a rod direction.

* * * * *